(12) United States Patent
Wu (10) Patent No.: US 12,052,356 B2
(45) Date of Patent: Jul. 30, 2024

(54) METHOD AND APPARATUS FOR DATA STORAGE AND VERIFICATION

(71) Applicant: Alibaba Group Holding Limited, Grand Cayman (KY)

(72) Inventor: Caidi Wu, Shanghai (CN)

(73) Assignee: Alibaba Group Holding Limited, George Town (KY)

( * ) Notice: Subject to any disclaimer, the term of this patent is extended or adjusted under 35 U.S.C. 154(b) by 128 days.

(21) Appl. No.: 17/481,131

(22) Filed: Sep. 21, 2021

(65) Prior Publication Data

US 2022/0006617 A1 Jan. 6, 2022

Related U.S. Application Data

(63) Continuation of application No. PCT/CN2020/078528, filed on Mar. 10, 2020.

(30) Foreign Application Priority Data

Mar. 22, 2019 (CN) .......................... 201910221335.9

(51) Int. Cl.
*H04L 9/08* (2006.01)
*G06F 21/53* (2013.01)

(52) U.S. Cl.
CPC .............. *H04L 9/088* (2013.01); *G06F 21/53* (2013.01)

(58) Field of Classification Search
CPC ................................ H04L 9/088; G06F 21/53
See application file for complete search history.

(56) References Cited

U.S. PATENT DOCUMENTS

| 7,613,743 | B1 | 11/2009 | Giampaolo et al. |
| 8,255,371 | B2 | 8/2012 | Giampaolo et al. |
| 8,458,133 | B2 | 6/2013 | Wakrat et al. |
| 8,489,655 | B2 | 7/2013 | Aronovich et al. |
| 8,818,897 | B1 * | 8/2014 | Slodki ............... H04L 9/3247 726/17 |
| 9,767,271 | B2 | 9/2017 | Ghose |
| 9,927,980 | B1 | 3/2018 | LeCrone et al. |

(Continued)

FOREIGN PATENT DOCUMENTS

| CN | 101231595 A | 7/2008 |
| CN | 104079539 A | 10/2014 |
| CN | 104156451 A | 11/2014 |

OTHER PUBLICATIONS

Translation of International Search Report mailed May 27, 2020, from corresponding PCT Application No. PCT/CN2020/078528, 2 pages.

(Continued)

*Primary Examiner* — Ayoub Alata
(74) *Attorney, Agent, or Firm* — Lee & Hayes, P.C.

(57) ABSTRACT

Disclosed are data storage and verification methods and a device executable in a trusted execution environment. The data storage method comprises: encrypting, using a first key, user data and version information of the user data to generate first ciphertext, and storing the first ciphertext into a general storage space (S310); generating verification information of the user data (S320); and storing the version information and the verification information into a secure storage space (S330). The present disclosure effectively prevents version rollback of user data.

17 Claims, 5 Drawing Sheets

(56) References Cited

U.S. PATENT DOCUMENTS

| | | | |
|---|---|---|---|
| 9,952,931 B2 | 4/2018 | Larson et al. | |
| 10,129,252 B1 | 11/2018 | Suen | |
| 2008/0178171 A1* | 7/2008 | Sueyoshi | G06F 8/65 717/171 |
| 2016/0313987 A1* | 10/2016 | Son | G06F 8/65 |
| 2019/0166488 A1* | 5/2019 | Park | H04W 12/041 |

OTHER PUBLICATIONS

Translation of Written Opinion mailed May 27, 2020, from corresponding PCT Application No. PCT/CN2020/078528, 4 pages.

* cited by examiner

ENCRYPT, USING FIRST KEY, USER DATA AND VERSION INFORMATION OF USER DATA TO GENERATE FIRST CIPHERTEXT, AND STORE FIRST CIPHERTEXT INTO GENERAL STORAGE SPACE
S310

GENERATE VERIFICATION INFORMATION OF USER DATA
S320

STORE VERSION INFORMATION AND VERIFICATION INFORMATION INTO SECURE STORAGE SPACE
S330

```
┌─────────────────────────────────────────────────────────┐
│ ACQUIRE FIRST CIPHERTEXT FROM GENERAL STORAGE SPACE AND │
│         DECRYPT FIRST CIPHERTEXT TO OBTAIN USER         │
│              DATA AND VERSION INFORMATION               │
│                          S410                           │
└─────────────────────────────────────────────────────────┘
                             │
                             ▼
┌─────────────────────────────────────────────────────────┐
│  ACQUIRE, FROM SECURE STORAGE SPACE, VERSION            │
│           INFORMATION AND VERIFICATION INFORMATION      │
│                          S420                           │
└─────────────────────────────────────────────────────────┘
                             │
                             ▼
┌─────────────────────────────────────────────────────────┐
│          COMPUTE VERIFICATION INFORMATION OF USER DATA  │
│                          S430                           │
└─────────────────────────────────────────────────────────┘
                             │
                             ▼
┌─────────────────────────────────────────────────────────┐
│ IF VERSION INFORMATION OBTAINED BY DECRYPT FIRST        │
│ CIPHERTEXT IS SAME AS VERSION INFORMATION ACQUIRED FROM │
│ SECURE STORAGE SPACE, AND COMPUTED VERIFICATION         │
│ INFORMATION IS SAME AS VERIFICATION INFORMATION         │
│ ACQUIRED FROM SECURE STORAGE SPACE, DETERMINE USER DATA │
│ AND VERSION INFORMATION THEREOF AS SECURE               │
│                          S440                           │
└─────────────────────────────────────────────────────────┘
```

METHOD AND APPARATUS FOR DATA STORAGE AND VERIFICATION

CROSS REFERENCE TO RELATED APPLICATIONS

This application claims priority to and is a continuation of PCT Patent Application No. PCT/CN2020/078528, filed on 10 Mar. 2020 and entitled "METHOD AND APPARATUS FOR DATA STORAGE AND VERIFICATION," which claims priority to Chinese Patent Application No. 201910221335.9, filed on 22 Mar. 2019 and entitled "METHOD AND APPARATUS FOR DATA STORAGE AND VERIFICATION," which are incorporated herein by reference in their entirety.

TECHNICAL FIELD

The present disclosure relates to the technical field of data security, and, more particularly, to data storage and verification methods and devices.

BACKGROUND

With the increasing popularity of terminal devices, more types and numbers of devices are becoming available. At the same time, data security problems resulting from the various types and large numbers of device have eventually brought concerns among users.

Data rolling back to previous versions would bring potential security risks to user data. For example, a terminal device typically has password(s), fingerprint(s), and other data of a user stored thereon. The user may modify such data in the process of using the terminal device. If the modified data is rolled back to the previous version, a minor consequence is that the terminal devices cannot be used, while a severe consequence is that the rollback might cause heavy monetary losses to the users. For another example, a new version of an application typically fixes security vulnerabilities of the old version of the application. If the new version of the application is rolled back to the old version, the security vulnerabilities will recur, which may cause sensitive information leakage or monetary losses to users.

Therefore, providing a technical solution that can prevent data from rolling back to previous versions is desired.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

To address the technical solutions, the present disclosure provides data storage and verification methods and a device that attempt to solve or at least alleviate the above-described problem.

According to an example embodiment of the present disclosure, a data storage method is provided and is executable in a trusted execution environment. The method comprises: encrypting, using a first key, user data and version information of the user data to generate first ciphertext, and storing the first ciphertext into a general storage space; generating verification information of the user data; and storing the version information and the verification information into a secure storage space.

According to an example embodiment of the present disclosure, a data verification method is provided and executable in a trusted execution environment. The method comprises: acquiring first ciphertext from a general storage space and decrypting the same to obtain user data and version information; acquiring, from a secure storage space, version information and verification information; computing verification information of the user data; and if the version information obtained by decrypting the first ciphertext is the same as the version information acquired from the secure storage space, and the computed verification information is the same as the verification information acquired from the secure storage space, determining the user data and the version information thereof as secure.

According to an example embodiment of the present disclosure, a computing device is provided, comprising: at least one processor; and a memory having stored therein program instructions, wherein when the program instructions are read and executed by the processor, the computing device is caused to execute the data storage method and data verification method as described above.

According to an example embodiment of the present disclosure, a readable storage medium having stored therein program instructions is provided, and when the program instructions are read and executed by a computing device, the computing device is caused to execute the data storage method and data verification method as described above.

The present disclosure first provides a secure storage solution for user data and version information. In this solution, a first key is used to encrypt user data and version information of the user data in a trusted execution environment to generate first ciphertext, which is stored in a general storage space; and the version information and verification information of the user data are stored in a secure storage space.

The trusted execution environment is an isolated and trusted environment, and the first key is kept in the trusted execution environment, thus preventing related data from being acquired or tampered with during the process of generating the first ciphertext. The secure storage space is a partition with a security feature in a storage device. Storing the version information and verification information in the secure storage space ensures security of the version information and verification information, thus preventing such information from being tampered with. Additionally, storing the user data (which is typically large in data size) in the general storage space with a larger capacity, and storing the version information and verification information (which is small in data size) in the secure storage space with a limited capacity not only ensures data security, but further enhances storage efficiency.

Corresponding to the secure storage solution described above, the present disclosure further provides a solution capable of verifying whether the version of user data is rolled back. In this solution, first ciphertext is acquired from a general storage space and decrypted to obtain user data and version information; verification information of the user data is computed accordingly; and version information and verification information are acquired from a secure storage space. If the version information obtained by decrypting the first ciphertext is the same as the version information acquired from the secure storage space, it indicates that the version information is not rolled back. If the computed verification information is the same as the verification information acquired from the secure storage space, it indicates that the user data has not been tampered with, avoiding the case in which only the user data is rolled back to an old version while the version information remains unchanged.

The above description is only an overview of the technical solutions of the present disclosure. In order for those skilled in the art to understand the technical means of the present disclosure more clearly and then implement the solutions pursuant to the content of the specification, and further, to make the above and other objectives, features, and advantages of the present disclosure more obvious and understandable, specific embodiments of the present disclosure are explained as follows.

BRIEF DESCRIPTION OF DRAWINGS

In order to achieve the above and related objectives, certain illustrative aspects are described herein in conjunction with the following description and accompanying drawings. These aspects indicate various ways to implement the principles disclosed herein. All aspects and equivalents thereof fall into the scope of the claimed subject matter. By reading the following detailed description in conjunction with the accompanying drawings, the above and other objectives, features, and advantages of the present disclosure will become more apparent. Throughout this disclosure, same reference numerals typically refer to the same parts or elements.

DESCRIPTION OF EMBODIMENTS

Hereinafter, exemplary embodiments of the present disclosure will be described in further detail with reference to the accompanying drawings. Although the drawings show exemplary embodiments of the present disclosure, it should be appreciated that the present disclosure may be implemented in various forms and should not be limited by the embodiments set forth herein. Rather, these embodiments are provided to enable a more thorough understanding of the present disclosure and to fully convey the scope of the present disclosure to those skilled in the art.

Figure 1:
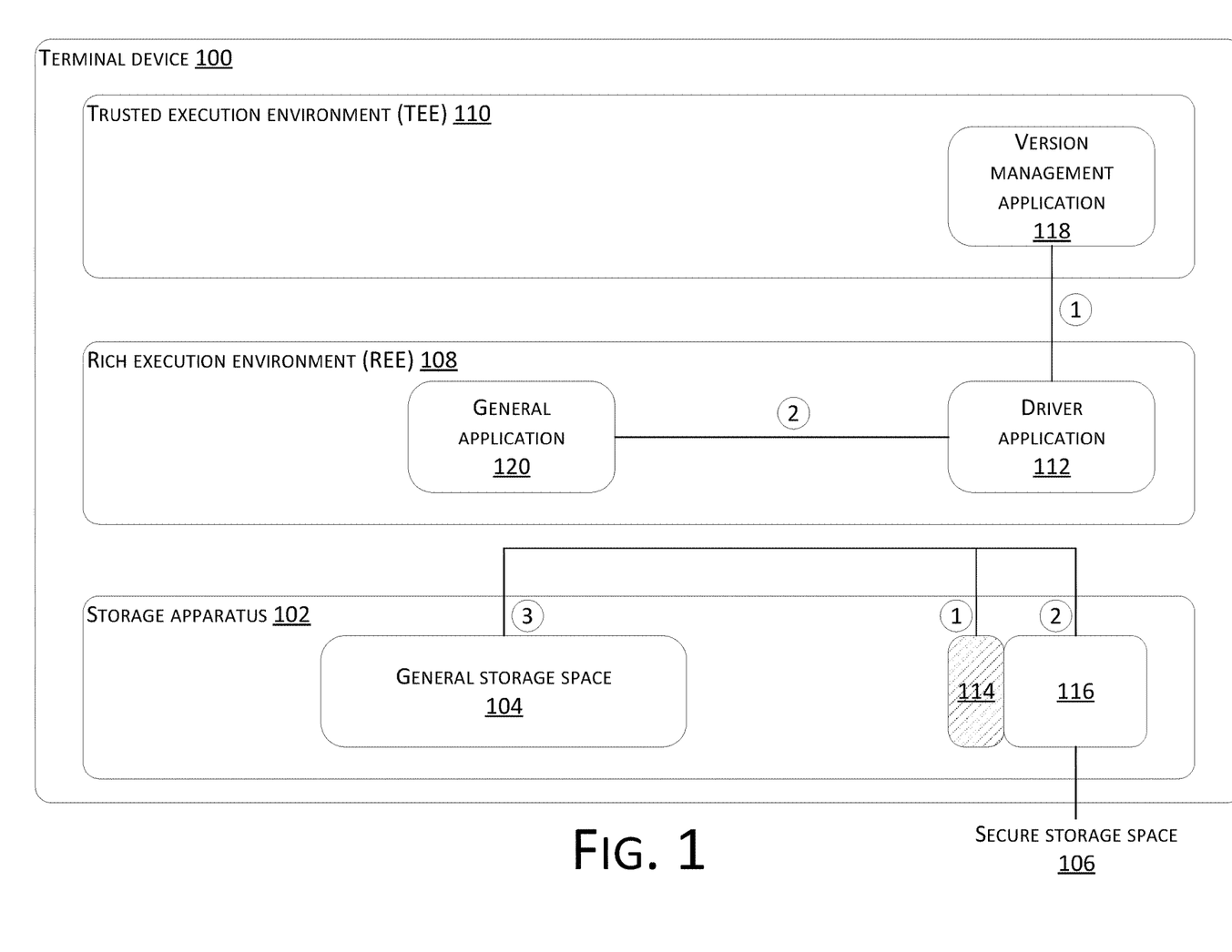
FIG. 1 shows a schematic diagram of a terminal device 100 according to an embodiment of the present disclosure.

FIG. 1 shows a schematic diagram of a terminal device 100 according to an embodiment of the present disclosure. The terminal device 100 may be implemented as any device, for example, a mobile phone, a tablet computer, a smart wearable device, a smart home appliance, a vehicle, an unmanned vehicle, etc., but is not limited thereto.

As shown in FIG. 1, a trusted execution environment (TEE) 110 and a rich execution environment (REE) 108 are deployed in the terminal device 100. The trusted execution environment 110 and the rich execution environment 108 have different and isolated hardware and independent operating systems to meet the operating requirements of applications having different security levels. The hardware isolation between the trusted execution environment 110 and the rich execution environment 108 may be implemented by, for example, the security extension technology of ARM TrustZone or C-SKY, but is not limited thereto.

The operating system of the rich execution environment 108 may be a general-purpose operating system, such as Android, iOS, a RTOS real-time operating system, etc. General applications that do not require high security, such as instant messaging, image capturing, weather query, etc., are enabled to run thereon. The operating system of the trusted execution environment 110 is typically a closed, relatively simple secure operating system. Trusted applications having higher security requirements, for example, fingerprint recognition, identity authentication, electronic payment, smart locks, etc., are running on said operating system. The trusted applications in the trusted execution environment 110 may be called by the general applications in the rich execution environment 108 to achieve corresponding functions. For example, a general application A is a shopping application located in the rich execution environment 108; and a trusted application B is a fingerprint verification application located in the trusted execution environment 110. When a user purchases a product on the general application A, the user may choose the fingerprint-based payment manner to complete the payment. At this point, the general application A calls the trusted application B to achieve the function of fingerprint verification. In particular, the trusted application B reads a stored fingerprint template, compares the template against a fingerprint inputted by the user, and returns the comparison result to the general application A.

The storage apparatus shown in FIG. 1 is used to store user data. The user data may be a data object in any form stored on the terminal device, for example, an application, a file, and identity information (e.g., a password, a fingerprint, iris data, etc.), but is not limited thereto. The storage apparatus may be divided into multiple independent partitions, with the functions, security, and stored data content being different in each of the partitions.

In an embodiment of the present disclosure, as shown in the FIG. 1, the storage apparatus 102 is divided into a general storage space 104 and a secure storage space 106. Corresponding file systems (FS) may be respectively configured for the general storage space 104 and the secure storage space 106. The file systems are software used to manage and store file information. The file systems include, for example, a fourth extended file system (Ext4), a file system in user space (FUSE), a virtual file allocation table (vFTA), etc., but are not limited thereto.

The general storage space 104 is a storage space having no security verification mechanism, which may be accessed by any application in the rich execution environment 108 or the trusted execution environment 110. The secure storage space 106 is a storage space having a security verification mechanism. When data is to be written into the secure storage space 106, the legitimacy of the data needs to be verified, and writing is only allowed after the legitimacy verification is successful. When data is to be read, a signing mechanism is provided to ensure that the read data is data from the secure storage space 106, rather than data forged by an attacker. It should be noted that in order to implement storage device partitioning, data reading and writing, security verification, and other functions, a corresponding driver application 112 typically needs to be configured in the rich execution environment 108 to achieve functions of the storage device, such as reading and writing.

In the case where special definitions are not provided, the secure storage space 106 may be accessed by any application that is capable of providing a legitimate signature and passing the verification in the rich execution environment 108 or trusted execution environment 110. According to an embodiment, the secure storage space 106 may further be defined and divided, such that a specific area within the secure storage space 106 may only be accessed by certain applications in the rich execution environment 108 or the trusted execution environment 110.

In some embodiments, each trusted application corresponds to a dedicated storage area. In order to ensure data security, the dedicated storage area corresponding to the trusted application is located in the secure storage space. That is, the secure storage space 106 may be divided into multiple non-overlapping areas, and some areas are dedicated storage areas for the trusted applications. Accordingly, these areas may only be accessed by the corresponding trusted applications. As shown in FIG. 1, the secured storage space 106 includes a storage area 114 and a storage area 116. The storage area 114 is a dedicated storage area of a version management application 118 (a trusted application) in the TEE 110. Accordingly, only the version management application 118 can read data from and write data to the storage area 114, as shown by the path labeled ①. The storage area 116 has no special definition, and may be accessed by any application capable of passing the security verification. For example, both the version management application 118 and a general application 120 may access the storage area 116. The path of the general application 120 accessing the storage area 116 is shown as label ②. The path of any application in the REE 108 or TEE 110 accessing the general storage space 104 is shown as label ③.

It should be noted that specific implementation manners of the storage apparatus are not limited by the present disclosure. As long as storage areas in the storage apparatus include a general storage area without security verification and a secure storage area with security verification, such a storage apparatus falls within the protection scope of the present disclosure. According to an embodiment, the storage apparatus may be implemented as an embedded memory card (also known as embedded multimedia card, abbreviated as eMMC).

Figure 2:
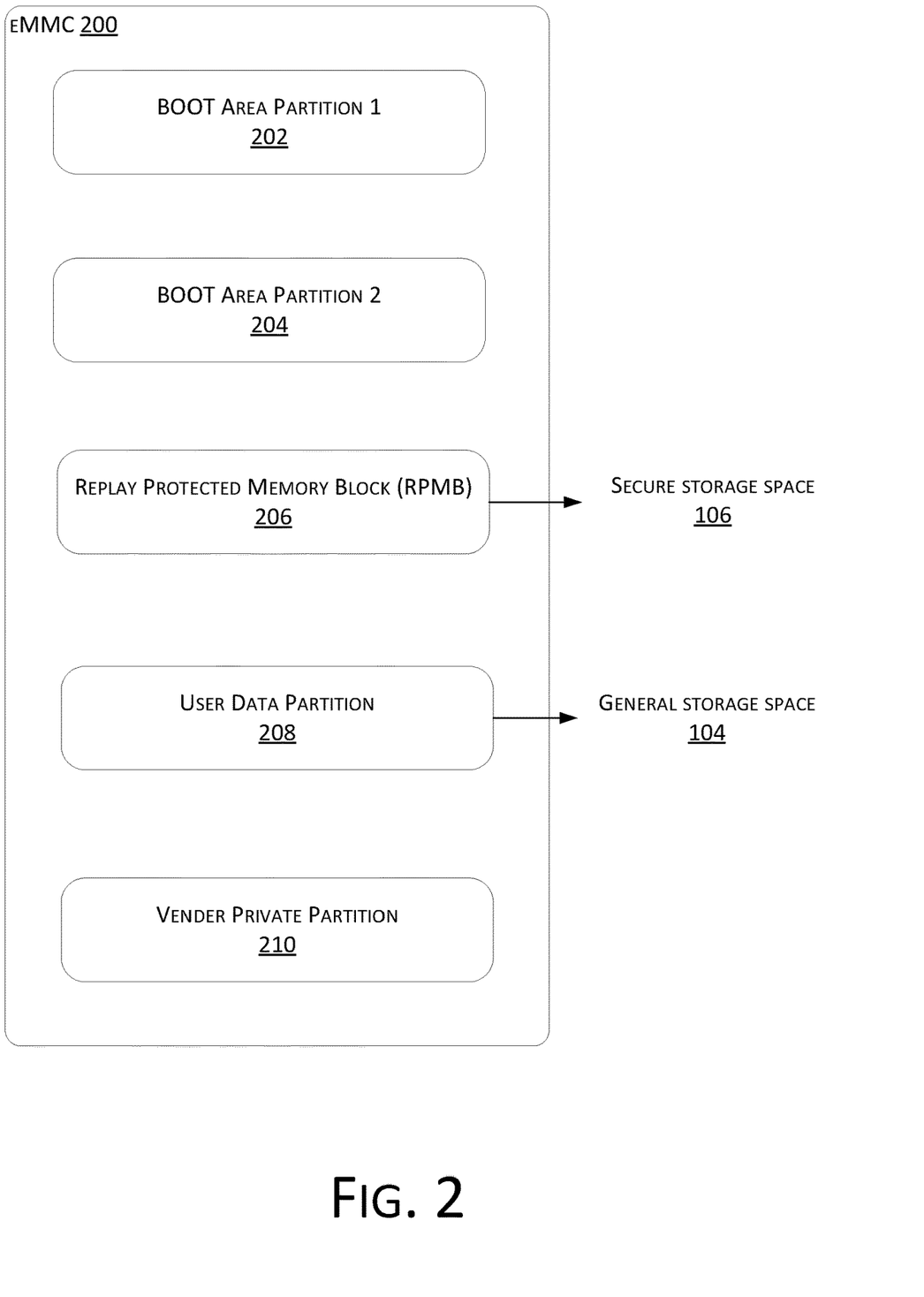
FIG. 2 shows a schematic diagram of partitions of an embedded memory card 200 according to an embodiment of the present disclosure.

FIG. 2 shows a schematic diagram of partitions of an embedded multimedia card or eMMC 200 according to an embodiment of the present disclosure. As shown in FIG. 2, the embedded multimedia card includes a first boot partition (BOOT Area Partition 1) 202, a second boot partition (BOOT Area Partition 2) 204, a secure partition (such as replay protected memory block, RPMB) 206, a user data partition (User Data Area) 208, and a reserved partition (Vender private area) 210. The first boot partition 202 and the second boot partition 204 are used to store critical data, such as device startup data or debugging configuration parameter data. The RPMB partition 206 is a partition having a security feature and used to store some special data that requires access authorization. The user data partition 208 is used to store various user data. The reserved partition 210, which is a partition reserved by the manufacturer, is invisible to the user, does not allow user operations, and has data of the eMMC stored therein, such as the firmware version number, startup key, etc. Among the above-mentioned partitions, the storage capacity of the user data partition 208 is relatively large, which typically occupies more than 90% of the entire capacity of the memory card. The storage capacities of the first boot partition 202, the second boot partition 204, the RPMB partition 206, and the reserved partition 210 are typically small.

Corresponding to the embodiment of the present disclosure, as shown in FIG. 1, if the storage apparatus of the terminal device 100 is implemented as an eMMC memory card 200, the general storage space 104 is the user data partition 208 of the eMMC memory card, and the secure storage area 106 is the RPMB partition (secure partition) of the eMMC memory card.

In an embodiment of the present disclosure, the trusted execution environment 110 includes the version management application 118, which is specifically used to manage user data and version information thereof and prevents data from being rolled back to the previous version, thereby ensuring data and property security on the terminal device. In particular, the version management application 118 is capable of providing a data storage solution for securely storing the user data and version information. In this solution, a first key is used to encrypt user data and version information of the user data to generate first ciphertext, which is stored in a general storage space; and the version information and verification information of the user data are stored in a secure storage space.

Corresponding to the data storage solution described above, the version management application 118 may further provide a data verification solution for verifying whether the version of the user data is rolled back. In this solution, first ciphertext is acquired from a general storage space and decrypted to obtain user data and version information; verification information of the user data is computed accordingly; and version information and verification information are acquired from a secure storage space. If the version information obtained by decrypting the first ciphertext is the same as the version information acquired from the secure storage space, it indicates that the version information is not rolled back. If the computed verification information is the same as the verification information acquired from the secure storage space, it indicates that the user data has not been tampered with, avoiding the case in which only the user data is rolled back to an old version while the version information remains unchanged.

The data storage method and data verification method of the present disclosure will be described in detail below.

Figure 3:
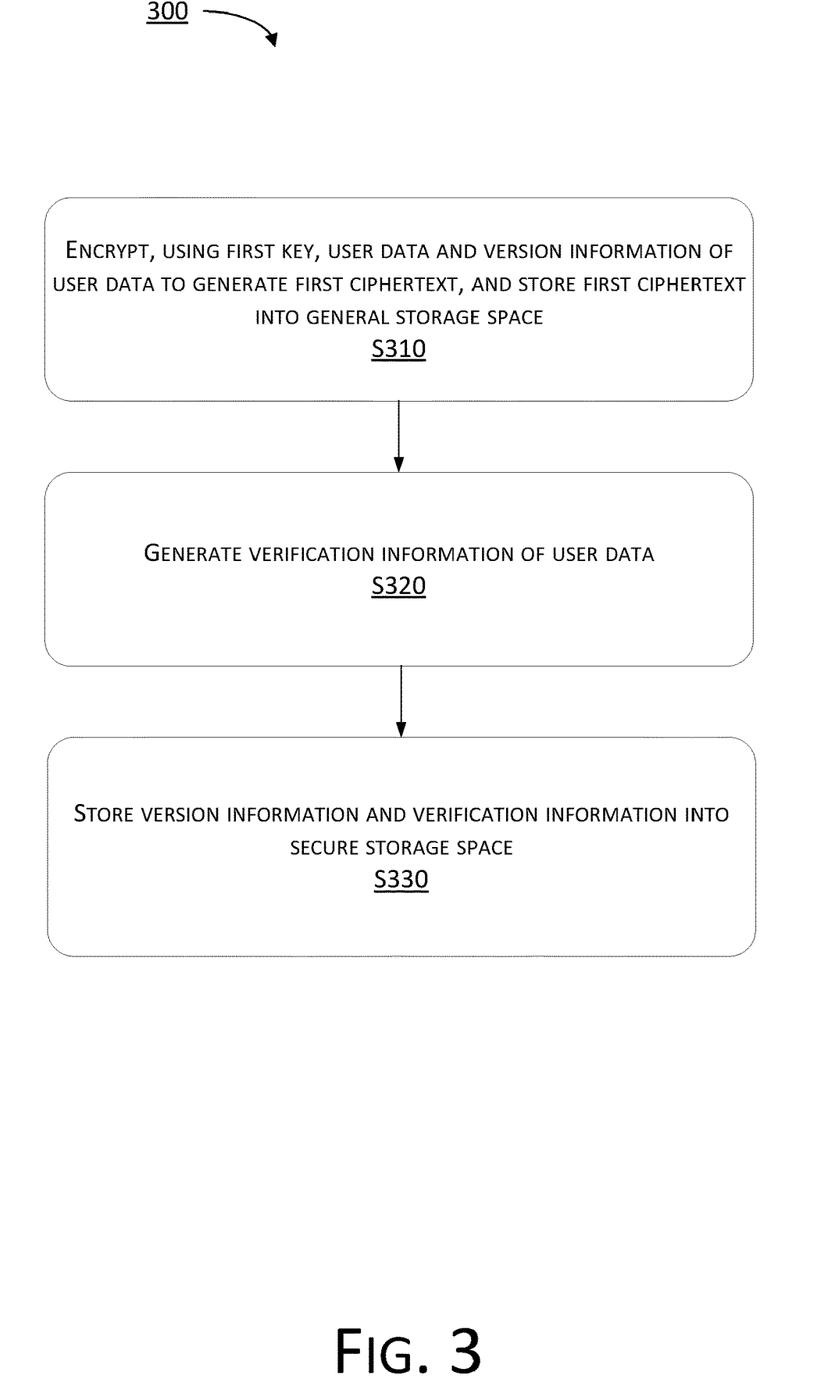
FIG. 3 shows a flowchart of a data storage method 300 according to an embodiment of the present disclosure.

FIG. 3 shows a flowchart of a data storage method 300 according to an embodiment of the present disclosure. The method 300 is executable in the trusted execution environment 110 of the terminal device. For example, as shown in FIG. 1, the method is executable by the version management application 118 in the trusted execution environment 110. As shown in FIG. 3, the method 300 starts with step S310.

In step S310, user data and version information of the user data are encrypted using a first key to generate a first ciphertext, and the first ciphertext is stored into the general storage space.

The user data may be a data object in any format, for example, an application, a file, and identity information (e.g., a password, a fingerprint, iris data, etc.), but is not limited thereto. The version information of the user data is used to indicate how old the user data is. The version information may include, for example, a version number, a version update time, etc., but is not limited thereto.

The first key is dynamically generated in the trusted execution environment 110, for example, by the version management application 118 in the trusted execution environment 110 in accordance with a certain rule. The so-called dynamic generation means that when the version management application 118 stores different sets of user data, the application generates a first key for each set of user data, such that each set of user data corresponds to one first key. That is, different sets of user data correspond to different first keys.

It should be noted that any algorithm may be used in the process of encrypting the user data and the version information using the first key. The present disclosure does not limit the encryption algorithm used to generate the first ciphertext. For example, the encryption algorithm may be the Advanced Encryption Standard (AES), the Data Encryption Standard (DES), the RSA encryption algorithm, etc., but is not limited thereto.

After the first ciphertext is generated, the first ciphertext is stored in the general storage space. According to an embodiment, the general storage space is a user data partition of an embedded memory card (eMMC). Accordingly, after the version management application 118 in the trusted execution environment 110 generates the first ciphertext, the first ciphertext is written into the user data partition of the eMMC by an eMMC driver application 112 in the rich execution environment 108.

Subsequently, in step S320, verification information of the user data is generated.

The verification information is used to verify the user data, so as to prevent the user data from being tampered with, thus ensuring the integrity of the user data. According to an embodiment, the verification information is a mapping value obtained by mapping user data using a preset mapping algorithm. It should be noted that those skilled in the art may map the user data using any mapping algorithm to obtain a mapping value. The specific types of mapping algorithms are not limited by the present disclosure. The mapping algorithm may be, for example, a hash algorithm, a message authentication code (MAC) algorithm, a Base64 encoding algorithm, etc., but is not limited thereto.

Subsequently, in step S330, the version information and the verification information are stored into the secure storage space.

According to an embodiment, the version management application 118 stores the version information and the verification information into a dedicated storage area of the version management application 118 located in the secure storage space, such as the storage area 114 in FIG. 1.

According to an embodiment, the secure storage space is a secure partition of the embedded memory card (eMMC), i.e., the RPMB partition. Accordingly, the version management application 118 in the trusted execution environment 110 stores, by means of the eMMC driver application located in the rich execution environment 108, the version information and the verification information into the RPMB partition of the eMMC.

The RPMB partition of the eMMC requires security verification when writing data. Correspondingly, the version information and the verification information are written into the RPMB partition in accordance with the following steps.

First, the version information and the verification information are combined into a data frame compliant with a write verification format of the secure storage space. The data frame includes the version information, the verification information, a write count value, and a signature value. The write count value is a value of a counter variable (write counter) stored in the eMMC, and the value of the write counter is incremented by one every time a legitimate RPMB write operation is performed. The write count value is pre-read from the eMMC by the version management application. Both the trusted execution environment 110 and the eMMC store therein a second key used to perform a RPMB security verification. The write count value may be read in accordance with the following steps.

First, the version management application 118 initiates a reading request for the write counter with the eMMC, and at the same time, generates a random number and sends the same to the eMMC. The eMMC then reads the value of the write counter, and computes, using the second key and the HMACSHA-256 algorithm, a signature value after the value of the write counter and the received random number are spliced together. Subsequently, the eMMC sends to the version management application 118 the value of the write counter, the received random number, and the signature obtained from the computation. After receiving the data sent by the eMMC, the version management application 118 first compares the random number with the random number previously sent by itself to see if they are consistent. If the comparison result indicates that they are consistent, then the version management application 118 uses the same second key to perform signing on the value of the write counter and the random number by means of the HMACSHA-256 algorithm. If the signature is consistent with the signature sent by the eMMC, it is determined that the value of the write counter is correct data, not data forged by an attacker.

The signature value in the data frame is ciphertext obtained by encrypting the version information, the verification information, and the write count value using the second key. The encryption algorithm used to generate the signature value may be, for example, the HMACSHA-256 algorithm, but is not limited thereto.

After generating the data frame including the version information, the verification information, the write count value, and the signature value, the version management application 118 sends the data frame to the eMMC for verification. The legitimacy of the write operation may be verified in accordance with the following steps. First, whether the write count value is consistent with the value of the write counter stored in the eMMC is determined; if so, a signature value of the version information, the verification information, and the value of the write counter is computed using the second key by means of the HMACSHA-256 algorithm. If the computed signature value is consistent with the signature value sent by the version management application 118, it indicates that authentication is successful, and the current write operation is legitimate. After the write operation is determined as legitimate according to the write count value and the signature value, the version information and the verification information are stored into the secure storage space, i.e., storing the version information and the verification information into the RPMB partition of the eMMC.

According to an embodiment, the second key is recorded in the trusted execution environment 110, and is managed by a specific application of the trusted execution environment 110 (for example, the version management application 118). As the second key is not exposed to the rich execution environment 108, the version information and the verification information in the secure storage space may only be read by a specific application(s) in the trusted execution environment 110. Other applications do not have knowledge of the second key and hence cannot obtain the version information and the verification information.

It should be noted that the first key in step S310 is dynamically generated in the trusted execution environment 110, while the second key is a fixed value recorded in the trusted execution environment 110. This is because the first ciphertext is stored in the general storage space having a lower security level. As a result, higher protection therefor is needed accordingly. A different first key is thus generated for each set of user data. The version information and the verification information, on the other hand, are stored in the secure storage space. The combination of the secure storage space and the trusted execution environment 110 has provided better security protection for the version information and the verification information. In addition, the second key is only used for authentication of read and write operations of the secure storage space.

The method 300 is executed in the trusted execution environment 110; and the first key and second key are kept in the trusted execution environment 110, thus preventing related data from being acquired or tampered with during the process of generating the first ciphertext, or the process of reading or writing operation of the secure storage space. After the method 300 is performed, the first ciphertext of the user data and the version information is stored in the general storage space, and the version information and the verification information are stored in the secure storage space. The secure storage space is a partition with a security feature in a storage device. Storing the version information and verification information in the secure storage space ensures security of the version information and verification information, thus preventing such information from being tampered with. Additionally, user data typically is large in data size, while version information and verification information are small in data size. Therefore, storing the user data in the general storage space with a large capacity and storing the version information and verification information in the secure storage space with a limited capacity not only ensures data security, but further enhances storage efficiency.

Figure 4:
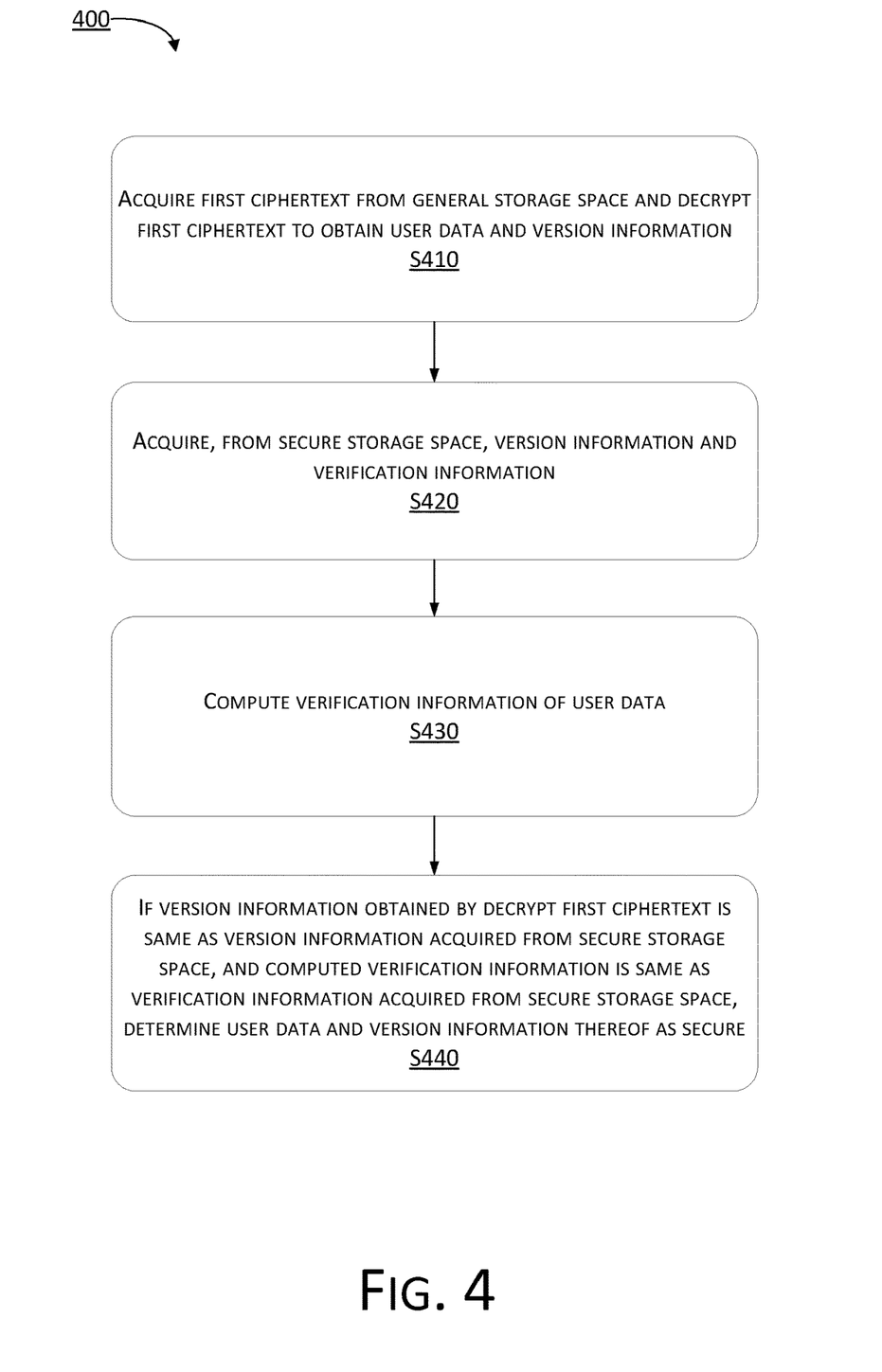
FIG. 4 shows a flowchart of a data verification method 400 according to an embodiment of the present disclosure.

FIG. 4 shows a flowchart of a data verification method 400 according to an embodiment of the present disclosure. The method 400 corresponds to the method 300, and is used to provide a data verification solution for verifying, based on the data storage solution provided by the method 300, whether the version of user data is rolled back. For example, when the user data needs to be read or called, the method 400 is first executed to verify whether the user data is secure, i.e., verifying whether the version of the user data is rolled back. The user data is called only after it is verified that the user data is secure.

The method 400 is executable in the trusted execution environment 110 of the terminal device. For example, as shown in FIG. 1, the method is executable by the version management application 118 in the trusted execution environment 110. As shown in FIG. 4, the method 400 starts with step S410.

In step S410, first ciphertext is acquired from a general storage space and decrypted to obtain user data and version information.

According to an embodiment, the version management application 118 reads, by means of the driver application 112 in the rich execution environment 108, the first ciphertext from the general storage space 104, and uses the first key to decrypt the first ciphertext to restore the user data and version information.

According to an embodiment, the general storage space is the user data partition of the embedded memory card (eMMC). Accordingly, the version management application 118 reads, by means of the eMMC driver application 112 in the rich execution environment 108, the first ciphertext from the user data partition.

Subsequently, in step S420, version information and verification information are acquired from a secure storage space.

According to an embodiment, the version management application 118 reads, by means of the driver application 112 in the rich execution environment 108, the version information and the verification information from the secure storage space 106.

According to an embodiment, the secure storage space is the secure partition of the embedded memory card (eMMC), i.e., the RPMB partition. Accordingly, the version management application 118 reads, by means of the eMMC driver application 112 in the rich execution environment 108, the version information and the verification information from the RPMB partition. The process of reading the version information and the verification information from the RPMB partition is as follows.

First, the version management application 118 initiates a request for reading the version information and the verification information with the eMMC, and at the same time, generates a random number and sends the same to the eMMC. Subsequently, the eMMC retrieves the version information and the verification information from the RPMB partition, and computes, using a second key and by means of the HMACSHA-256 algorithm, a signature after the version information, the verification information, and the received random number are spliced together. Subsequently, the eMMC sends the version information, the verification information, the received random number, and the computed signature to the version management application 118. After receiving the data sent by the eMMC, the version management application 118 first compares the random number with the random number previously sent by itself to see if they are consistent. If the comparison result indicates that they are consistent, then the version management application 118 uses the same second key to perform signing on the version information, the verification information, and the random number by means of the HMACSHA-256 algorithm. If the signature is consistent with the signature sent by the eMMC, it is determined that the version information and the verification information are correct data stored in the RPMB, not data forged by an attacker.

Subsequently, in step S430, verification information of the user data is computed.

The verification information of the user data is computed according to the user data obtained from the decryption in step S410 and by using the same mapping algorithm in step S320 above.

Subsequently, in step S440, if the version information obtained by decrypting the first ciphertext is the same as the version information acquired from the secure storage space, and the computed verification information is the same as the verification information acquired from the secure storage space, the user data and the version information thereof are determined as secure.

If the version information obtained by decrypting the first ciphertext is the same as the version information acquired from the secure storage space, it indicates that the version information has not been maliciously tampered with. That is, the version information itself is not rolled back. If the computed verification information is the same as the verification information acquired from the secure storage space, it indicates that the user data has not been tampered with, thereby avoiding the case in which an attacker cracks the storage format of the user data, and rolls back the user data to an old version while leaving the version information unchanged.

Based on the method 300 and the method 400, the present disclosure provides a technical solution capable of preventing user data from being rolled back to the previous version, and effectively avoids the cases in which version information is rolled back, user data is rolled back while version information remains unchanged, and the like. The methods 300 and 400 provide example embodiments of preventing versions from being rolled back. In addition to the methods 300 and 400, other embodiments may further be used to prevent versions from being rolled back.

For example, according to an embodiment, user data may be encrypted in a trusted execution environment 110, and then all the encrypted user data may be written into a secure storage space (for example, the RPMB partition of the eMMC) to prevent the user data from being tampered with. However, the capacity of existing secure storage spaces is typically small. If the user data has a large data size (for example, in the case that the user data is fingerprint or iris information), the secure storage space might not be able to store the entirety of the user data. Additionally, since the secure storage space has a security verification mechanism, the read and write performance thereof is typically poor. If the user data is large in data size, data reading and writing would take a long time, and data latency would occur, which leads to poor user experience.

According to another embodiment, user data may be encrypted in a trusted execution environment 110, and the encrypted user data may be stored into a general storage space (for example, the user data partition of the eMMC). Version information of the user data may be written into a secure storage space (for example, the RPMB partition of the eMMC) to prevent the version information from being tampered with. However, this solution lacks a complete verification link for the user data. If an attacker learns the format of a user data-containing file in the general storage space, he/she will be able to modify the user data in a precise manner without modifying the version information. In this case, the version information remains unchanged and is still the new version, but the user data is rolled back. Therefore, the solution still has potential security risks.

Figure 5:
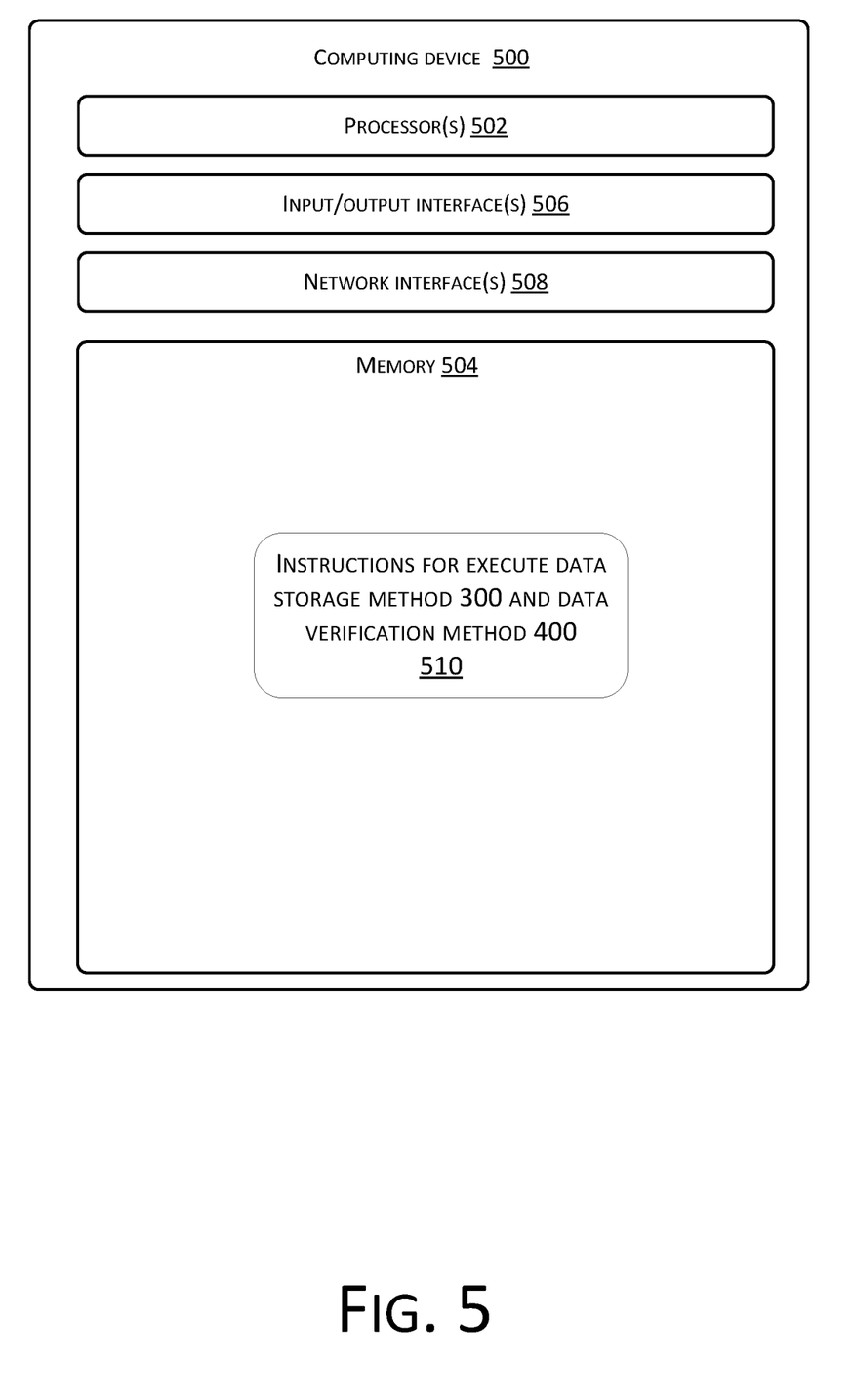
FIG. 5 shows a schematic diagram of a computing device 500 according to an embodiment of the present disclosure.

FIG. 5 shows a schematic diagram of a computing device 500 according to an embodiment of the present disclosure. As shown in FIG. 5, the computing device 500 includes one or more processor(s) 502 or data processing unit(s) and memory 504. The computing device 500 may further include one or more input/output interface(s) 506 and one or more network interface(s) 508.

The memory 504 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 504 stores therein program instructions or computer-readable instructions 510 for execute data storage method 300 and data verification method 400. When the program instructions are read and executed by the processor 502, the computing device 500 is caused to execute the data storing method 300 and the data verification method 400 of the present disclosure. When the memory 504 stores therein program instructions for executing the data storage method 300 and the data verification method 400 of the present disclosure, the computing device 500 is implemented as a terminal device of the present disclosure, for example, the terminal device 100 in FIG. 1 above.

The various techniques described herein may be implemented in combination with hardware or software, or a combination thereof. Therefore, the methods and devices of the present disclosure, or some aspects or part of the methods and devices of the present disclosure may adopt the form of program code (i.e., instructions) embedded in a physical medium, for example, a portable hard disk, a USB flash disk, a floppy disk, a CD-ROM, or any other machine-readable storage medium. When the program is loaded into a machine, such as a computer, and executed by the machine, the machine becomes a device for implementing the present disclosure.

In the case that the program code is executed on a programmable computer, a computing device typically includes a processor, a storage medium readable by the processor (including a volatile and non-volatile memory and/or storage component), at least one input device, and at least one output device. The memory is configured to store the program code; the processor is configured to execute the data storage and data verification methods of the present disclosure according to instructions in the program code stored in the memory.

By way of examples and not limitations, the readable medium includes a readable storage medium and a communication medium. The readable storage medium stores information, such as computer readable instructions, data structures, program modules, other data, or the like. The communication medium typically embodies computer-readable instructions, data structures, program modules, or other data in a data signal modulated by using a carrier wave, other transmission mechanisms, or the like, and includes any information delivering medium. Combinations of any of the above are also included in the scope of the readable medium.

In the specification provided herein, the algorithm and display are not inherently related to any particular computers, virtual systems, or other devices. Various general-purpose systems may also be used with the examples of the present disclosure. The structure required to construct such a system would be obvious according to the above description. In addition, the present disclosure is also not directed to any particular programming languages. It should be understood that various programming languages may be used to implement the content of the present disclosure described herein, and the above description of particular languages is for the purpose of disclosing the example implementations of the present disclosure.

In the specification provided herein, a large number of specific details are explained. However, it could be appreciated that the embodiments of the present disclosure may be implemented without these specific details. In some examples, well-known methods, structures, and techniques are not shown in detail, so as not to obscure the understanding of this specification.

Similarly, it should be appreciated that in order to simplify the present disclosure and to assist understanding of one or more of the various inventive aspects, various features of the present disclosure are sometimes grouped together into a single embodiment, figure, or description thereof in the above description of the exemplary embodiments of the present disclosure. However, the disclosed methods should not be construed as reflecting that the claimed invention requires more features than those explicitly stated in each claim. More precisely, as reflected in the following claims, the inventive aspects may lie in less than all the features of a single embodiment disclosed in the foregoing content. Therefore, the claims in line with particular implementations are thereby explicitly incorporated into the particular implementations, where each claim itself serves as a separate embodiment of the present disclosure.

Those skilled in the art should understand that the modules, units, or components of the devices in the examples disclosed herein may be arranged in a device as described in one of the embodiments, or be alternatively positioned in one or more devices different from the devices in the examples. The modules in the foregoing examples may be combined into one module or may be otherwise divided into multiple sub-modules.

Those skilled in the art could understand that modules in a device of an embodiment may be adaptively modified and disposed in one or more devices different from that of the embodiment. The modules, units, or components in an embodiment may be combined into one module, unit, or component, and may otherwise be divided into multiple sub-modules, sub-units, or sub-components. Except that at least some of such features and/or processes or units are mutually exclusive, any combination may be employed to combine all features disclosed in the specification (including the appended claims, abstract, and drawings) and all processes or units of any method or device such disclosed. Unless otherwise explicitly stated, each feature disclosed in the present specification (including the appended claims, abstract, and drawings) may be replaced by alternative features providing same, equivalent, or similar objectives.

In addition, those skilled in the art could understand that although some embodiments described herein include certain features included in other embodiments but not the other features thereof, a combination of features of different embodiments means that they are within the scope of the present disclosure and form a different embodiment. For example, in the following claims, any one of the claimed embodiments may be used in any combination.

In addition, some of the described embodiments are described herein as methods or combinations of method elements that can be implemented by a processor of a computer system or by other apparatuses that execute the functions. Therefore, a processor having the necessary instructions for implementing the methods or method elements forms an apparatus for implementing the methods or method elements. In addition, the elements of the apparatus embodiments described herein are examples of an apparatus used to implement functions executed by elements for implementing the purpose of the present disclosure.

As used herein, unless otherwise specified, the use of ordinal numbers "first," "second," "third," etc. to describe a general object merely represents different instances of similar objects, and is not intended to imply the objects described as such must have a given order in terms of time, space, sequence, or in any other way.

Although the present disclosure has been described in terms of a limited number of embodiments, benefiting from the above description, those skilled in the art would appreciate that other embodiments can be envisaged within the scope of this present disclosure described as such. In addition, it should be noted that the language used in this specification is mainly chosen for readability and teaching purposes, not for explaining or limiting the subject matter of the present disclosure. Therefore, without departing from the scope and spirit of the appended claims, numerous modifications and changes would be obvious to those of ordinary skill in the art. For the scope of the present disclosure, the disclosure of the present disclosure is illustrative rather than restrictive, and the scope of the present disclosure is defined by the appended claims.

The present disclosure may further be understood with clauses as follows.

Clause 1. A data storage method executable in a trusted execution environment, the method comprising:
    encrypting, using a first key, user data and version information of the user data to generate first ciphertext, and storing the first ciphertext into a general storage space;
    generating verification information of the user data; and
    storing the version information and the verification information into a secure storage space.

Clause 2. The method of clause 1, wherein the verification information is a mapping value obtained by mapping, using a preset mapping algorithm, the user data.

Clause 3. The method of clause 1, wherein the first key is dynamically generated in the trusted execution environment.

Clause 4. The method of clause 1, wherein the general storage space comprises a user data partition of an embedded memory card, and the secure storage space comprises a secure partition of the embedded memory card.

Clause 5. The method of clause 1 or 4, wherein the step of storing the version information and the verification information into the secure storage space comprises:
    storing, by means of a memory driver in a rich execution environment, the version information and the verification information into the secure storage space.

Clause 6. The method of clause 5, wherein the step of storing, by means of the memory driver in the rich execution environment, the version information and the verification information into the secure storage space comprises:
    combining the version information and the verification information into a data frame compliant with a write verification format of the secure storage space, the data frame comprising the version information, the verification information, a write count value, and a signature value, and the signature value being ciphertext obtained by encrypting, using a second key, the version information, the verification information, and the write count value; and
    after the memory driver determines, according to the write count value and the signature value, that a current write operation is legitimate, storing the version information and the verification information into the secure storage space.

Clause 7. The method of clause 6, wherein the second key is recorded in the trusted execution environment.

Clause 8. A data verification method executable in a trusted execution environment, the method comprising:
    acquiring first ciphertext from a general storage space and decrypting the same to obtain user data and version information;
    acquiring, from a secure storage space, version information and verification information;
    computing verification information of the user data; and
    if the version information obtained by decrypting the first ciphertext is the same as the version information acquired from the secure storage space, and the computed verification information is the same as the verification information acquired from the secure storage space, determining the user data and the version information thereof as secure.

Clause 9. The method of clause 8, wherein the computing the verification information of the user data comprises: mapping, using a preset mapping algorithm, the user data to obtain the verification information.

Clause 10. The method of clause 8, wherein the general storage space comprises a user data partition of an embedded memory card, and the secure storage space comprises a secure partition of an embedded memory.

Clause 11. A computing device, comprising:
at least one processor; and
a memory having stored therein program instructions, wherein when the program instructions are read and executed by the processor, the computing device is caused to execute the method of any one of clauses 1-10.

Clause 12. A readable storage medium having stored therein program instructions, wherein when the program instructions are read and executed by a computing device, the computing device is caused to execute the method of any one of claims 1-10.

What is claimed is:

1. A method comprising:
encrypting, using a first key, user data and version information of the user data to generate a first ciphertext;
storing the first ciphertext into a general storage space;
generating verification information of the user data; and
storing the version information and the verification information into a secure storage space, the storing the version information and the verification information into the secure storage space comprising storing, by using a memory driver in a rich execution environment, the version information and the verification information into the secure storage space, the storing, by using the memory driver in the rich execution environment, the version information and the verification information into the secure storage space comprising:
combining the version information and the verification information into a data frame compliant with a write verification format of the secure storage space, the data frame comprising the version information, the verification information, a write count value, and a signature value, and the signature value being ciphertext obtained by encrypting, using a second key, the version information, the verification information, and the write count value; and
after the memory driver determines, according to the write count value and the signature value, that a current write operation is legitimate, storing the version information and the verification information into the secure storage space.

2. The method of claim 1, further comprising using a preset mapping algorithm to map the user data to obtain a mapping value.

3. The method of claim 2, wherein the verification information is the mapping value.

4. The method of claim 1, further comprising dynamically generating the first key in a trusted execution environment.

5. The method of claim 1, wherein the general storage space comprises a user data partition of an embedded memory card.

6. The method of claim 5, wherein the secure storage space comprises a secure partition of the embedded memory card.

7. The method of claim 1, further comprising recording the second key in a trusted execution environment.

8. A computing device comprising:
one or more processors; and
one or more memories storing thereon computer-readable instructions that, when executed by the one or more processors, cause the one or more processors to perform acts comprising:
acquiring a first ciphertext from a general storage space;
decrypting the first ciphertext to obtain user data and first version information;
computing first verification information of the user data;
acquiring, from a secure storage space, second version information and second verification information, wherein the secure storage spaces stores the second version information and the second verification information by using a memory driver in a rich execution environment, the second version information and the second verification information are combined into a data frame compliant with a write verification format of the secure storage space, the data frame comprising the second version information, the second verification information, a write count value, and a signature value, and the signature value is a ciphertext obtained by encrypting, using a key, the second version information, the second verification information, and the write count value; and
in response to determining that the first version information obtained by decrypting the first ciphertext is the same as the second version information acquired from the secure storage space, and the computed first verification information is the same as the second verification information acquired from the secure storage space, determining the user data and the first version information as secure.

9. The computing device of claim 8, wherein the computing the first verification information of the user data comprises:
mapping, using a preset mapping algorithm, the user data to obtain the first verification information.

10. The computing device of claim 8, wherein the general storage space comprises a user data partition of an embedded memory card.

11. The computing device of claim 10, wherein the secure storage space comprises a secure partition of the embedded memory card.

12. One or more memories storing thereon computer-readable instructions that, when executed by one or more processors, cause the one or more processors to perform acts comprising:
encrypting, using a first key, user data and version information of the user data to generate a first ciphertext;
storing the first ciphertext into a general storage space;
generating verification information of the user data; and
storing the version information and the verification information into a secure storage space, the storing the version information and the verification information into the secure storage space comprising storing, by using a memory driver in a rich execution environment, the version information and the verification information into the secure storage space, the storing, by using the memory driver in the rich execution environment, the version information and the verification information into the secure storage space comprising:

combining the version information and the verification information into a data frame compliant with a write verification format of the secure storage space, the data frame comprising the version information, the verification information, a write count value, and a signature value, and the signature value being ciphertext obtained by encrypting, using a second key, the version information, the verification information, and the write count value; and after the memory driver determines, according to the write count value and the signature value, that a current write operation is legitimate, storing the version information and the verification information into the secure storage space.

13. The one or more memories of claim 12, wherein the acts further comprise using a preset mapping algorithm to map the user data to obtain a mapping value as the verification information.

14. The one or more memories of claim 12, wherein the acts further comprise dynamically generating the first key in a trusted execution environment.

15. The one or more memories of claim 12, wherein:
the general storage space comprises a user data partition of an embedded memory card; and
the secure storage space comprises a secure partition of the embedded memory card.

16. The one or more memories of claim 12, wherein the acts further comprise recording the second key in a trusted execution environment.

17. The one or more memories of claim 13, wherein the verification information is the mapping value.

* * * * *